United States Patent [19]

Hunter

[11] 4,331,381
[45] May 25, 1982

[54] MAGNIFYING DEVICE

[76] Inventor: Radcliffe W. Hunter, 5000 S. Cornell, Chicago, Ill. 60615

[21] Appl. No.: 159,586

[22] Filed: Jun. 16, 1980

[51] Int. Cl.³ .............................................. G02B 27/02
[52] U.S. Cl. ..................................... 350/116; 33/488;
350/241
[58] Field of Search ................. 356/114–115, 356/238, 241, 247, 82, 248–249, 72; 350/116, 241; 33/488

[56] References Cited

U.S. PATENT DOCUMENTS

| | | | |
|---|---|---|---|
| 1,773,899 | 8/1930 | Kaler | 350/116 |
| 1,806,422 | 5/1931 | Shaen | 350/116 |
| 2,355,161 | 8/1944 | Holstein | 350/116 |
| 2,435,741 | 2/1948 | Fleenor | 350/243 |
| 2,746,346 | 5/1956 | Gaire | 350/116 |

FOREIGN PATENT DOCUMENTS

| | | | |
|---|---|---|---|
| 596096 | 12/1947 | United Kingdom | 350/116 |
| 1417882 | 12/1975 | United Kingdom . | |

*Primary Examiner*—William H. Punter

[57] ABSTRACT

The invention comprises an adjustable magnifying device adapted for use on measuring instruments such as architectural, engineering or mechanical drafting scales. The device includes a vertical support member having a head, a spacing component and a shaft; a horizontal magnifying unit pivotally attached to the spacing component of the support member; and a receiving member spirally attached to the shaft of the support member. The receiving member includes a cylindrical indentation for spirally securing the shaft of the support member and a passageway of triangular cross section which receives and attaches to the top section of measuring instrument of triangular cross section. When the device is used in connection with relatively flat measuring instruments, an adapter of generally triangular cross section is received by and attaches to the receiving member of the device and also attaches to the upper surface of the measuring instrument. The magnifying device can be freely removed in the longitudinal direction while attached to the measuring instrument or the adapter. The magnifying unit may be pivoted to either side of the measuring instrument and adjusted vertically to allow for variations in the visual capabilities of persons using the device.

1 Claim, 6 Drawing Figures

U.S. Patent    May 25, 1982    4,331,381
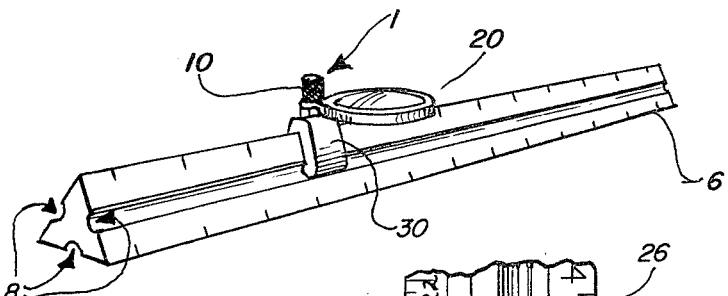
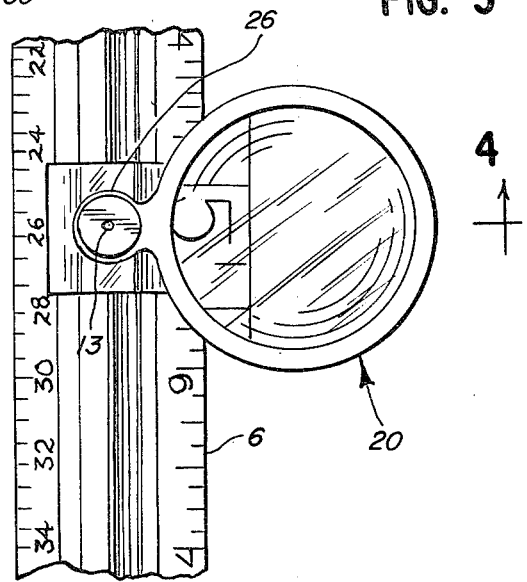
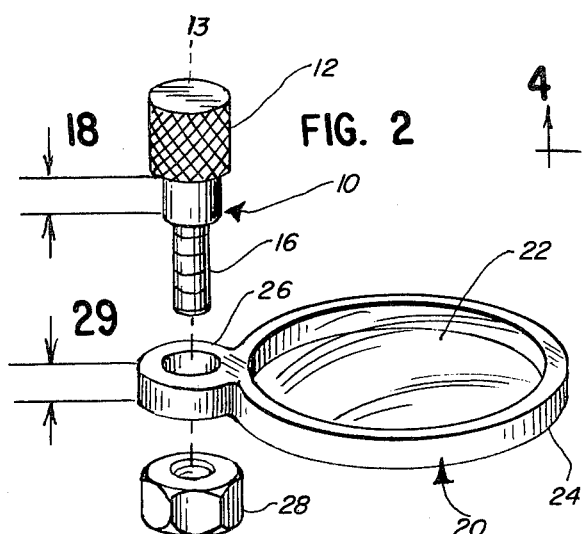
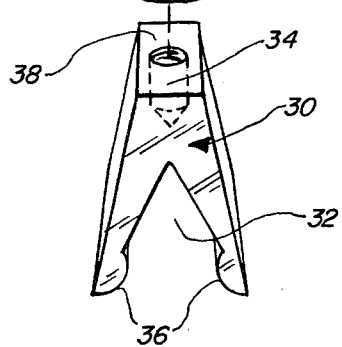
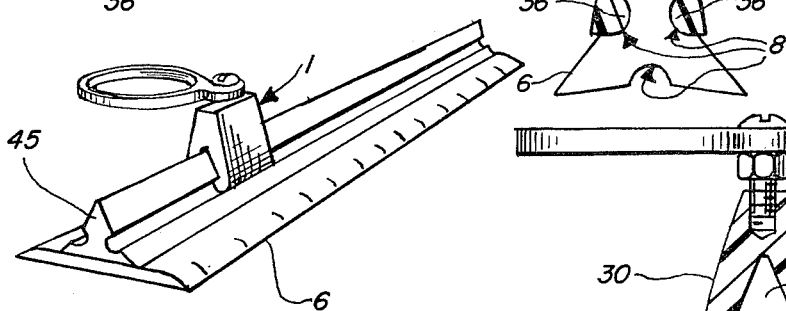
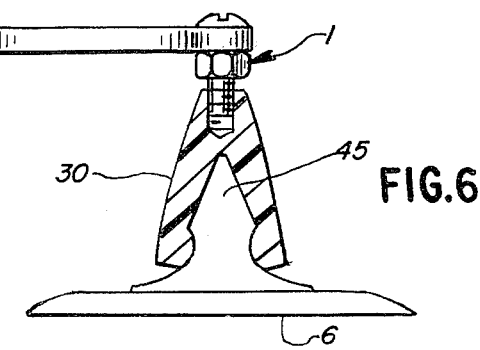

MAGNIFYING DEVICE

BACKGROUND OF THE INVENTION

1. FIELD OF INVENTION

This invention relates to magnifying devices and, more particularly, to magnifying devices used in connection with measuring instruments.

2. BACKGROUND OF THE PRIOR ART

Measuring instruments used to perform scaling operations for architectural, engineering or mechanical drafting are well known. Such instruments have graduated spaces representing various scales marked along their length and are either of generally triangular cross section or of a relatively flat configuration.

In many situations, there is a need to magnify the graduated spaces marked on the measuring instrument. For example, magnification greatly reduces the likelihood that persons of normal vision will experience eye strain or fatigue as a result of prolonged detailed work. In addition, magnification assists visually impaired persons in making more accurate measurements. Further, magnification greatly facilitates the instruction of persons, such as students or beginning draftsmen, who are inexperienced in the proper use of such measuring instruments.

Currently, several methods are used to magnify measuring instruments and the adjacent work surface. The first and most obvious method is simply to transpose a hand-held magnifying glass between the eye of the draftsman and the measuring instrument. The primary disadvantage of this method is simply that a draftsman cannot, in one simultaneous and continuous operation, hold the magnifying glass, secure a measuring instrument in the desired location and manipulate a writing or marking tool. Because the draftsman must limit his simultaneous activities to those which can be accomplished properly with two hands, utilization of this method of magnification will inevitably result in decreased drafting efficiency.

A second method currently used to magnify measuring instruments is the utilization of an eye piece fitted with a magnifying lens. The primary problem with this method is that after each time such eye pieces are used, the draftsman must stop drawing in order to remove and store the eye piece. Because magnification is usually not required during every phase of drafting operations, this method is extremely inconvenient and results in decreased drafting efficiency. In addition, this type of eye piece limits the draftsman to the use of one eye, thereby introducing a potential source of measuring error and eye strain.

Another current method of magnifying measuring instruments is taught in U.S. Pat. No. 2,455,972. This method provides a magnifying lens concentrically secured to a pen, pencil or other writing or marking tool. The lens is shaped and secured to the tool so that the focal point of the lens will insure that the operator will see the magnified portion of the measuring instrument and tool in proper focus. This method of magnification has two distinct disadvantages. First, because the magnifying lens is secured to the writing tool, it is necessary for the draftsman to remove and re-install this device each time a change of writing tools is necessary. Because draftsmen frequently change pencils or pens, the use of this device is extremely inconvenient and results in lessened efficiency.

The second significant problem with the method of magnification taught in U.S. Pat. No. 2,455,972 is that the magnifying lens extends appreciably outside the circumference of the writing tool. As a result, this method is not suited for use in connection with measuring instruments of triangular configuration unless the vertical dimension of such instruments is substantially less than the distance from the working end of the writing tool to the lower surface of the lens. If this requirement is satisfied, the resulting device will have a configuration in which the user will be forced, because of the placement of the magnifying lens, to grasp the stem of the writing tool higher than is customary. As a result, this method has proven inefficient when used in connection with measuring instruments of triangular configuration.

SUMMARY OF THE INVENTION

The invention comprises an adjustable magnifying device adapted for use on measuring instruments. The invention includes a vertical support member having a head, integral with and of greater cross sectional area than a spacing component which is also integral with a threaded shaft; a horizontal magnifying unit pivotally secured to the spacing component of the support member; and a receiving member spirally attached to the shaft of the support member.

The magnifying unit includes a magnifying lens, a frame which receives and secures the periphery of the magnifying lens, a pivotal attachment element integrally joined to the periphery of the frame for receiving the spacing component of the support member, and a retention element which cooperates with the shaft to restrain the pivotal attachment element to the area of the spacing component.

The scale receiving member includes a cylindrical indentation for spirally securing the shaft of the support member and a passageway of triangular cross section bordered by two guide members for receiving the top portion of measuring instruments of triangular cross section so as to permit the magnifying device to be moved freely in the longitudinal direction. When the device is used in connection with relatively flat measuring instruments, an adapter of generally triangular cross section is received by and attaches to the receiving member and also attaches to the upper surface of the measuring instrument.

The magnifying device is adjusted vertically by turning the head of the support member, causing the shaft to vertically ascend from or descend into the cylindrical indentation provided in the receiving member.

It is, therefore, an object of the subject invention to provide a magnifying device which can be freely moved maintained at any point along the length of a measuring instrument, without the continuous use of hands or significant work stoppage.

Another object of the subject invention is to provide a magnifying device used in connection with measuring instruments which can be removed from the field of vision without significant work stoppage, storred conveniently, and retrieved quickly for subsequent use.

A further object of the subject invention is to provide a magnifying device which can be conveniently used for drafting or measuring operations requiring frequent changes of writing or marking tools.

Other objects and advantages will be pointed out or will become apparent to those skilled in the art from a reading of the following specifications in conjunction with the accompanying drawing.

BRIEF DESCRIPTION OF THE DRAWINGS

FIG. 1 is a perspective view of the magnifying device of the subject invention and an associated measuring instrument.

FIG. 2 is an exploded front view of the magnifying device of the subject invention.

FIG. 3 is a top view of the magnifying device of the subject invention.

FIG. 4 is a sectional view of the magnifying device of the subject invention and an associated measuring instrument taken along line 4—4 of FIG. 3.

FIG. 5 is a perspective view of the magnifying device of the subject invention used in connection with an associated adapter for use with flat measuring instruments.

FIG. 6 is a side view of the magnifying device of the subject inventor used in connection with an associated adapter for use with flat measuring instruments.

DETAILED DESCRIPTION OF INVENTION

Referring to FIG. 1, a magnifying device 1 having a support member 10, a magnifying unit 20 and a receiving member 30, is shown in association with a measuring instrument 6 of generally triangular cross section having three longitudinal grooves 8. Such measuring instruments are of standard construction and are well known in the drafting industry.

Referring now to FIG. 2, the support member 10 is composed of a rotatable head 12, a spacing component 14 and a threaded shaft 16. The magnifying unit 20 is composed of a magnifying lens 22, a frame 24 which secures the periphery of the lens 22, a circular band 26 integrally joined to the frame 24 and a nut 28 having threads matched with those of the shaft 16. The receiving member 30 consists of a unitary block having a top surface 38, a cylindrical indentation 34 and a triangular passageway 32 bordered by two guide members 36. The head 12 is concentric with the spacing element 14 and has a larger cross sectional area. The cross sectional area of the spacing element 14 is such that it may be tightly inserted into the circular band 26, which pivotally attaches the magnifying unit 20 to the support member 10. When the spacing component 14 is inserted in the circular band 26, the head 12 acts to restrict movement of the circular band 26 in one longitudinal direction. The longitudinal dimension 18 of the spacing component 14 is slightly greater than the thickness 29 of the circular band 26. This permits the magnifying unit 20 to be freely rotatable about the longitudinal axis 13 of the support member 10 when the nut 28 is tightly positioned at the interface between the spacing element 14 and the shaft 16; thereby restricting movement of the circular band 26 in the other longitudinal direction and limiting the circular band 26 to the longitudinal dimension 18 of the spacing component 14.

When the nut 28 is so positioned, the magnifying unit 20 is maintained in a plane generally perpendicular to the longitudinal axis 13 of the support member 10. At the same time, the magnifying unit 20 can be rotated through 360° to permit the magnifying unit 20 to be easily removed from and stored out of the draftsman's field of vision when magnification is not needed. Yet, if magnification is subsequently required, the magnifying unit 20 can be pivoted quickly back into the draftsman's field of vision.

Referring now to FIG. 3, the circular band 26 permits the magnifying unit 20 to be freely pivoted about the longitudinal axis 13 of the support member 10 so that when magnification is not required the magnifying unit 20 may be removed from the draftsman's line of sight.

Referring now to FIG. 4, the vertical distance between the magnifying unit 20 and the measuring instrument 6 is adjusted to provide for variations in visual capabilities by manually turning the head 12 of the support member 10 causing the shaft 16, which is spirally secured to the cylindrical indentation 34 by means of matched threads, to rise or fall within the cylindrical indentation 34 in relation to the top surface 38 of the instrument receiving member 30. The magnifying device 1 is attached to a measuring instrument 6 of triangular cross section by inserting one end of the measuring instrument 6 into the triangular passageway 32 so that two grooves 8 of the measuring instrument 6 engage the guide members 36 of the receiving member 30. The device 1 is disengaged by simply completely withdrawing the measuring instrument 6 from the passageway 32. When the device 1 is attached to the measuring instrument 6, the magnifying unit 20 is maintained in a generally horizontal position without the use of hands. In addition, because of the interlocking relationship between the grooves 8 and the guide members 36, the device 1 is freely moved to any point along the measuring instrument 6 without disengaging the receiving member 30.

Referring now to FIGS. 5 and 6, when the device 1 is used in connection with a flat measuring instrument 6', an adapter 45 of generally triangular cross section is received by and attaches to the receiving member 30 and attaches to the upper surface of the measuring instrument 6' by means of suction mechanisms or other temporary means.

While the principles of the invention have been described in connection with the above specific apparatus, it is to be clearly understood that this description is made only by way of example, and not as a limitation to the scope of the invention:

I claim:

1. A magnifying device, adapted for use on measuring instruments of triangular cross section, comprising: a support member comprising:

a head rotatable by 360° in the horizontal plane;

a spacing component, adjacent to and having the same longitudinal axis as said head, said spacing component having a cross sectional area less than that of said head;

a threaded shaft, adjacent to and extending along said longitudinal axis from said spacing component;

magnifying means pivotally attached to said spacing component at right angles to the longitudinal axis of said support member to permit rotation of 360° in the horizontal plane, said magnifying means comprising:

a magnifying lens;

a frame which receives and secures the periphery of said magnifying lens;

means for pivotally attaching said frame to said spacing component of said supporting means, said pivotal attaching means permitting said frame to be rotated 360° in the horizontal plane about said head, said pivotal attaching means comprising a circular band whose inside cross sectional area is matched with the cross sectional area of said spacing component and whose thickness is slightly less than the longitudinal dimension of said spacing component, said circular band being integral with the periphery of said frame;

means for retaining said pivotal attaching means to the area of said spacing component, said retaining means comprising a nut which spirally cooperates with said shaft by means of matched threads;

and means for receiving said measuring instruments, said receiving means being spirally attached to said shaft of said supporting member, said receiving means comprising a unitary block having:

a passageway having a cross section conforming to the contours of the top of said measuring instruments;

and a cylindrical indentation having threads matched with those of said shaft for spirally securing said shaft to said unitary block.

* * * * *